United States Patent
Chillar et al.

(10) Patent No.: US 7,861,511 B2
(45) Date of Patent: Jan. 4, 2011

(54) SYSTEM FOR RECIRCULATING THE EXHAUST OF A TURBOMACHINE

(75) Inventors: Rahul J. Chillar, Greenville, SC (US); Robert W. Taylor, Ponte Vedra Beach, FL (US); James E. Roberts, Kansas City, MO (US)

(73) Assignee: General Electric Company, Schenectady, NY (US)

( * ) Notice: Subject to any disclaimer, the term of this patent is extended or adjusted under 35 U.S.C. 154(b) by 495 days.

(21) Appl. No.: 11/928,038

(22) Filed: Oct. 30, 2007

(65) Prior Publication Data

US 2009/0107141 A1    Apr. 30, 2009

(51) Int. Cl.
| | |
|---|---|
| F02G 1/00 | (2006.01) |
| F02G 3/00 | (2006.01) |
| F02M 25/07 | (2006.01) |
| F02M 25/06 | (2006.01) |
| C10L 3/00 | (2006.01) |
| C01B 3/32 | (2006.01) |

(52) U.S. Cl. .......... 60/39.52; 60/39.12; 60/39.5; 60/605.2; 60/278; 48/127.3

(58) Field of Classification Search .......... 60/605.2, 60/39.5, 39.52, 39.12, 278, 302, 311, 784, 60/781, 755, 649; 422/171; 423/242.3; 252/373; 95/215; 96/355; 48/127.3; 429/410; 55/315; F02M 25/07; F02B 37/00

See application file for complete search history.

(56) References Cited

U.S. PATENT DOCUMENTS

| | | | | |
|---|---|---|---|---|
| 3,473,298 | A | * | 10/1969 | Berman .......... 96/355 |
| 3,589,313 | A | * | 6/1971 | Smith et al. .......... 55/315 |
| 4,040,816 | A | * | 8/1977 | Altenhoner et al. .......... 75/490 |
| 4,269,806 | A | * | 5/1981 | Yaguchi et al. .......... 422/171 |
| 4,305,733 | A | * | 12/1981 | Scholz et al. .......... 48/127.3 |
| 4,337,231 | A | * | 6/1982 | Yaguchi et al. .......... 423/242.3 |
| 4,434,613 | A | * | 3/1984 | Stahl .......... 60/39.52 |
| 4,492,085 | A | * | 1/1985 | Stahl et al. .......... 60/649 |
| 5,232,793 | A | * | 8/1993 | Miyauchi et al. .......... 429/410 |
| 5,590,519 | A | * | 1/1997 | Almlof et al. .......... 60/39.5 |
| 5,657,630 | A | * | 8/1997 | Kjemtrup et al. .......... 60/605.2 |
| 5,955,037 | A | * | 9/1999 | Holst et al. .......... 422/171 |
| 6,202,400 | B1 | * | 3/2001 | Utamura et al. .......... 60/39.52 |
| 6,223,519 | B1 | * | 5/2001 | Basu et al. .......... 60/39.12 |
| 6,301,888 | B1 | * | 10/2001 | Gray, Jr. .......... 60/605.2 |
| 6,470,682 | B2 | * | 10/2002 | Gray, Jr. .......... 60/605.2 |
| 6,637,183 | B2 | * | 10/2003 | Viteri et al. .......... 60/39.52 |
| 6,800,115 | B2 | * | 10/2004 | Eimer .......... 95/215 |
| 7,266,943 | B2 | * | 9/2007 | Kammel .......... 60/311 |
| 7,638,070 | B2 | * | 12/2009 | Johnson et al. .......... 252/373 |
| 2005/0028529 | A1 | * | 2/2005 | Bartlett et al. .......... 60/39.52 |

(Continued)

FOREIGN PATENT DOCUMENTS

JP          57073827 A  *  5/1982  .......... 60/39.52

(Continued)

*Primary Examiner*—Thai Ba Trieu
(74) *Attorney, Agent, or Firm*—Dale J. Davis; Ernest G. Cusick; Frank A. Landgraff

(57) ABSTRACT

A portion of the exhaust generated by a turbomachine is recirculated through an inlet portion by an exhaust gas recirculation system. The system reduces the level of harmful constituents within the exhaust before the exhaust is recirculated.

17 Claims, 5 Drawing Sheets

U.S. PATENT DOCUMENTS

| | | | |
|---|---|---|---|
| 2006/0207262 A1* | 9/2006 | Firey | 60/784 |
| 2007/0277514 A1* | 12/2007 | Kammel | 60/302 |
| 2008/0309087 A1* | 12/2008 | Evulet et al. | 60/278 |
| 2009/0013867 A1* | 1/2009 | McCutchen | 95/35 |
| 2009/0241515 A1* | 10/2009 | Cardno | 60/278 |
| 2009/0284013 A1* | 11/2009 | Anand et al. | 60/39.5 |

FOREIGN PATENT DOCUMENTS

JP    2002332919 A  * 11/2002

* cited by examiner

SYSTEM FOR RECIRCULATING THE EXHAUST OF A TURBOMACHINE

BACKGROUND OF THE INVENTION

The present invention relates to the exhaust gas emitted from a turbomachine, and more particularly to a system for reducing the harmful constituents within the exhaust gas before recirculating the exhaust gas back into the turbomachine.

There is a growing concern over the long-term effects of Nitrous Oxide (hereinafter NOx) and Carbon Dioxide (hereinafter "$CO_2$") and Sulfur emissions on the environment. The allowable levels of NOx and $CO_2$ that may be emitted by a turbomachine, such as a gas turbine, are heavily regulated. Operators of turbomachines desire methods of reducing the levels of NOx and $CO_2$ emitted.

Exhaust gas recirculation (EGR) generally involves recirculating a portion of the emitted exhaust through an inlet portion of the turbomachine where it is mixed with the incoming airflow prior to combustion. This process facilitates the removal and sequestration of the emitted NOx and concentrated CO2 levels, thereby reducing the net emission levels.

There are a few problems with the currently known EGR systems. Impurities and moisture within the exhaust gas prevent utilizing a simple re-circulating loop to reduce the $CO_2$ and NOx reduction. Turbine fouling, corrosion, and accelerated wear of internal turbomachine components would result from introducing the exhaust gas directly to the turbomachine inlet portion. As a result, the diverted exhaust gas should be treated prior to blending with the inlet air. Significant amounts of condensable vapors exist in the exhaust gas stream. These vapors usually contain a variety of constituents such as water vapor, acids, aldehydes, hydrocarbons, sulfur, and chlorine compounds. Left untreated, these constituents will accelerate corrosion and the fouling of the internal components, if allowed to enter the inlet of a gas turbine.

For the foregoing reasons, there is a need for system for treating the recirculated exhaust gas stream to minimize the impact of harmful constituents within the exhaust gas stream on turbomachine components.

BRIEF DESCRIPTION OF THE INVENTION

In accordance with an embodiment of the present invention, a system for reducing constituents within at least one exhaust stream of at least one turbomachine comprising an inlet portion and an exhaust portion; the system comprising: providing at least one exhaust gas recirculation system (EGR) comprising at least one scrubber; wherein the at least one scrubber can: receive the at least one exhaust stream at a first temperature from the exhaust portion of the at least one turbomachine; receive the at least one exhaust stream comprising constituents at a first level; reduce the constituents to a second level; and allow the at least one exhaust stream to exit at a second temperature; and wherein the at least one exhaust stream is a portion of the total exhaust exiting the at least one turbomachine; and wherein the at least one EGR recirculates the at least one exhaust stream exiting the at least one scrubber to the inlet portion.

DETAILED DESCRIPTION OF THE INVENTION

Figure 1:
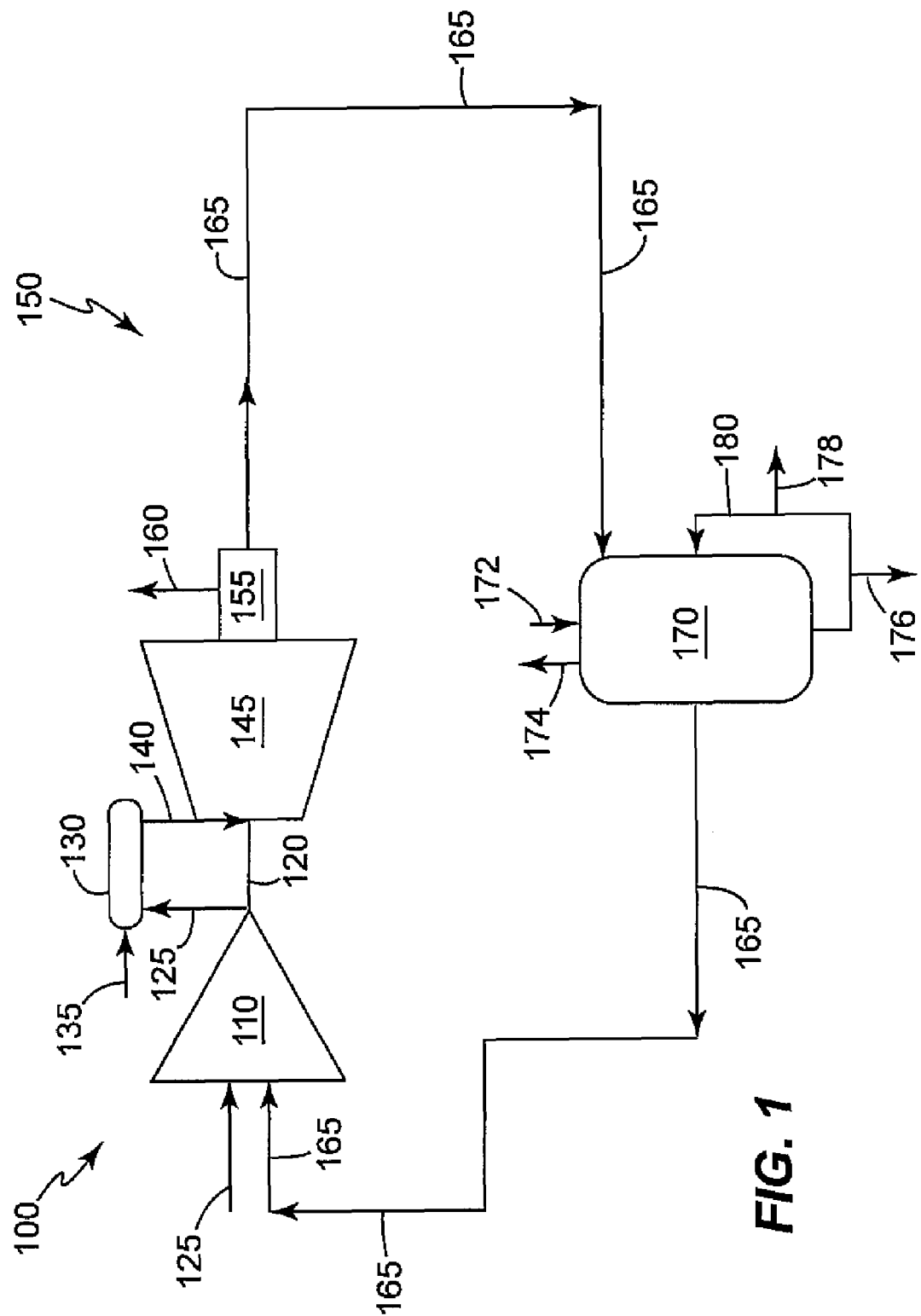
FIG. 1 is a schematic illustrating an example of a system for recirculating the exhaust of a turbomachine in accordance with an embodiment of the present invention.

The following detailed description of preferred embodiments refers to the accompanying drawings, which illustrate specific embodiments of the invention. Other embodiments having different structures and operations do not depart from the scope of the present invention.

Certain terminology is used herein for the convenience of the reader only and is not to be taken as a limitation on the scope of the invention. For example, words such as "upper," "lower," "left," "right," "front", "rear" "top", "bottom", "horizontal," "vertical," "upstream," "downstream," "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

An embodiment of the present invention takes the form of a system that may recirculate a portion of the exhaust of at least one turbomachine where it may be mixed with the inlet air and re-enter the turbomachine without affecting reliability and availability of the unit.

Generally, the exhaust gas recirculation system of an embodiment of the present invention comprises of multiple elements. The configuration and sequence of the elements may be dictated by the composition of the exhaust gas. In general, the steps comprising the exhaust gas recirculation process are: cooling, scrubbing, de-misting, high efficiency particulate and droplet removal, and mixing. When the present invention is utilized, the diverted gas blended with inlet air, can be introduced to the turbine inlet. As described below, there are multiple arrangements that may be used to accomplish the exhaust gas treatment.

The present invention has the technical effect of reducing the levels of NOx, concentrated $CO_2$, and harmful constituents, all of which may be within a portion of the exhaust (hereinafter "exhaust stream", or the like). These levels may be reduced from a first level to a second level that may be determined by an operator of the turbomachine. An embodiment of the present invention may also allow for the removal and sequestration of concentrated $CO_2$ emissions.

The present invention may be applied to the variety of turbomachines that produce a gaseous fluid, such as, but not limiting of, a heavy duty gas turbine; an aero-derivative gas turbine; or the like (hereinafter referred to as "gas turbine"). An embodiment of the present invention may be applied to either a single gas turbine or a plurality of gas turbines. An embodiment of the present invention may be applied to a gas turbine operating in a simple cycle or a combined cycle configuration.

As described below, an embodiment of the present invention may utilize at least one scrubber; or at least one scrubber and at least one downstream heat exchanger; or at least one scrubber and at least one upstream heat exchanger; or at least one scrubber, at least one downstream heat exchanger; and at least one upstream heat exchanger; or various combinations thereof. Moreover, each and any of the aforementioned embodiments may include an injector that may introduce a reagent for reducing the level of harmful constituents within the exhaust stream; and a wet electrostatic precipitator for removing the constituents.

The elements of the present invention, such as, but not limiting of, a scrubber and a heat exchanger may be fabricated of any material that can withstand the operating environment under which the exhaust gas recirculation system may function and operate.

Referring now to the Figures, where the various numbers represent like elements throughout the several views, FIG. 1 is a schematic illustrating an example of a system for recirculating the exhaust of a turbomachine in accordance with an embodiment of the present invention. FIG. 1 illustrates a gas turbine 100 and an exhaust gas recirculation system 150.

The gas turbine 100 comprises a compressor 110 having a shaft 120. Air enters the inlet of the compressor at 125, is compressed by the compressor 110 and is then discharged to a combustion system 130, where a fuel 135 such as, but not limiting of, natural gas is burned to provide high-energy combustion gases 140, which drive the turbine 145. In the turbine 145, the energy of the hot gases is converted into work, some of which is used to drive the compressor 110 through the shaft 120, with the remainder being available for useful work to drive a load (not illustrated).

The exhaust gas recirculation system 150, as illustrated in FIG. 1, comprises at least one EGR flow modulation device 155 and at least one scrubber 170.

The at least one EGR flow modulation device 155 may apportion the total exhaust flow (not illustrated in FIG. 1) between a non-recirculated exhaust 160 and at least one exhaust stream 165. The at least one EGR flow modulation device 155 may be of a size and fabricated of a material capable of withstanding the physical properties, such as, but not limiting of, a flowrate of about 10000 Lb/hr to about 50000000 Lb/hr and a temperature of about 100 F to about 1500 F.

An operator of the gas turbine 100, may determine the position of the at least one EGR flow modulation device 155 based on the desired flowrate of the at least one exhaust stream 165. The at least one exhaust stream 165 may flow downstream of the at least one EGR flow modulation device 155 to an inlet portion of the at least one scrubber 170.

A scrubber system (hereinafter "scrubber") is generally considered as an air pollution control device that may remove particulates and/or other emissions from industrial exhaust streams. A scrubber may use a "scrubbing process", or the like, involving a liquid to "scrub" unwanted pollutants from a gas stream.

In an embodiment of the present invention the at least one scrubber 170 may perform a few functions after receiving the at least one exhaust stream 165. The at least one scrubber 170 may lower the temperature of the at least one exhaust stream 165 to a range of about 60 degrees Fahrenheit to about 100 degrees Fahrenheit. The at least one scrubber 170 may also remove a portion of the plurality of constituents (not illustrated) within the at least one exhaust stream 165, from a first level to a second level. In an embodiment of the present invention an operator of the at least one turbomachine may determine the requirements of the second level. The constituents may include for example, but not limiting of, at least one of: water vapor, acids, aldehydes, hydrocarbons, or combinations thereof.

The at least one scrubber 170 may receive and then later discharge a scrubber cooling fluid 172,174; which may be of a type that allows for the heat transfer required to lower the temperature of the at least one exhaust stream 165, as discussed.

The at least one scrubber 170 may include at least one scrubber blow down line 176; which may remove the portion of the aforementioned constituents and concentrated $CO_2$. The condensable line 178 may remove the portions of at least one exhaust stream 165 that may condense during the scrubbing process. The scrubber recirculation line 180 may recirculate a portion of the at least one exhaust stream 165 to increase the effectiveness of the scrubbing process.

After the scrubbing process, the at least one exhaust stream 165 may flow downstream to the compressor 110. The exhaust gas recirculation system 150 may then mix the inlet air 125 with the at least one exhaust stream 165, prior to the compression performed by the compressor 110.

In use, the exhaust gas recirculation system 150 of the above described embodiment of the present invention functions while the gas turbine 100 is in operation. The EGR flow modulation device 155 may be positioned to allow for the desired flowrate of the at least one exhaust stream 165, and the non-recirculated exhaust 160 may flow through an exhaust stack (not illustrated), or the like or elsewhere such as, but not limiting of, a heat recovery steam generator (not illustrated). The at least one exhaust stream 165 may then flow downstream through the at least one scrubber 170, as described above. In the at least one scrubber 170, the temperature of the at least one exhaust stream 165, may be lowered to below the saturation temperature. The use of the scrubber cooling fluid 172,174 and the drop in temperature of the at least one exhaust stream 165, may cause a portion of the at least one exhaust stream 165 to flow through the scrubber recirculation line 180. Here, a portion of condensable vapors of the at least one exhaust stream 165 may be removed via the condensable line 178. Next, the at least one exhaust stream 165 may flow downstream of the at least one scrubber 170 and into the compressor 110.

The alternate embodiments of the present invention discussed below, and illustrated in FIGS. 2 through 5, modify the flow path of the at least one exhaust stream 165 and the configuration of the exhaust gas recirculation system 150. The discussion of each embodiment will emphasize the differences from the embodiment discussed above. Furthermore, FIGS. 2 through 5 illustrate the at least one gas turbine 100 configured for a combined cycle operation. Here, a heat recovery steam generator (HRSG) 200 receives the total exhaust of the gas turbine 100. As illustrated in FIGS. 2 through 5, the EGR flow modulation device 155 may be connected downstream of the HRSG 200 and function as previously described.

Figure 2:
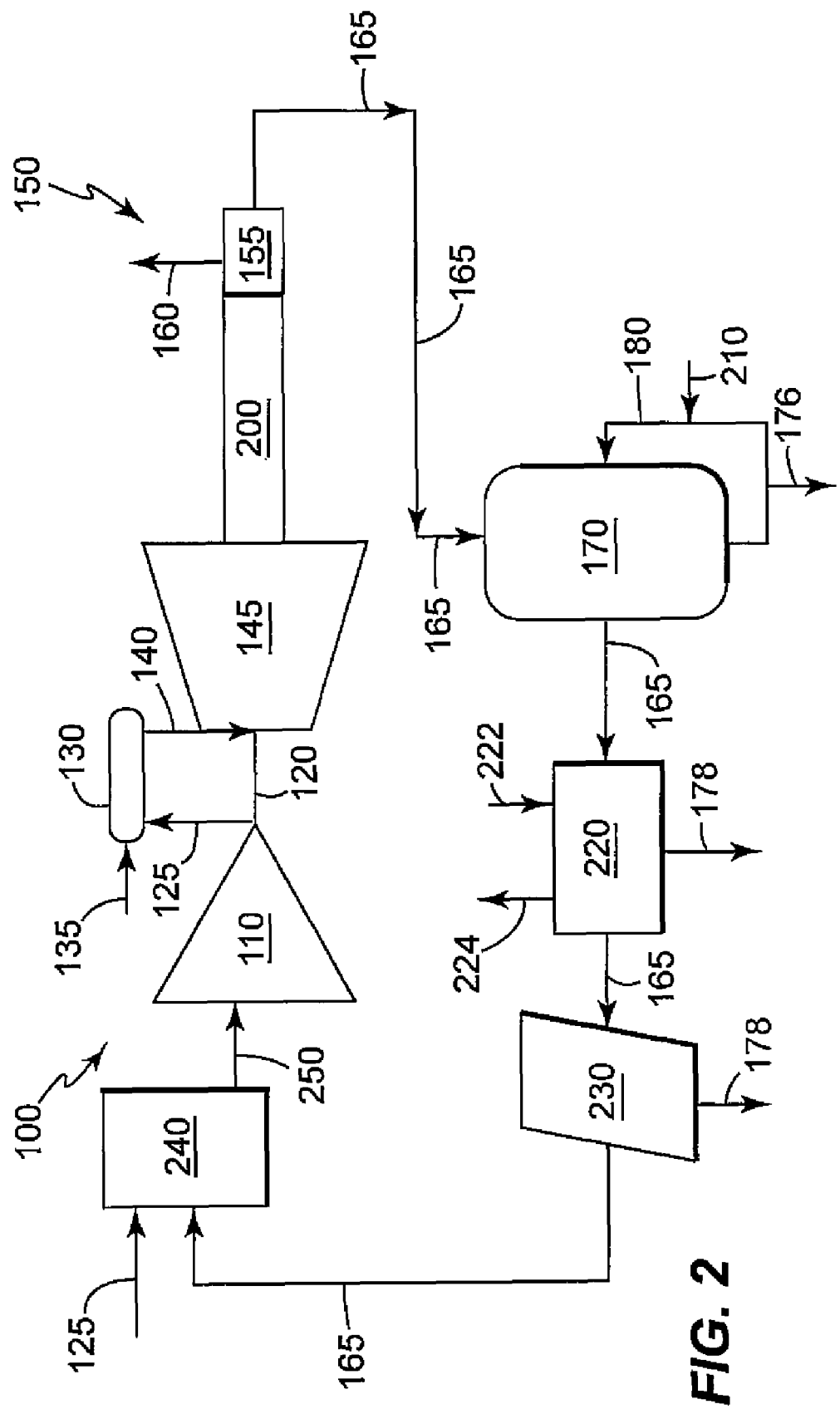
FIG. 2 is a schematic illustrating an example of a system for recirculating the exhaust of a turbomachine in accordance with a second embodiment of the present invention.

FIG. 2 is a schematic illustrating an example of a system for recirculating the exhaust of a turbomachine in accordance with a second embodiment of the present invention. In this second embodiment of the present invention, the exhaust gas recirculation system 150 may include: at least one scrubber 170, at least one downstream heat exchanger 220; at least one de-mister 230; and at least one mixing station 240.

The at least one scrubber 170, in this second embodiment of the present scrubber 170, may reduce the temperature of the at least one exhaust stream 165 and may also remove a portion of the plurality of constituents (not illustrated) within the at least one exhaust stream 165, as described.

The at least one scrubber 170 may include at least one scrubber blow down line 176; and at least one scrubber recirculation line 180, as described. The at least one scrubber 170 may also include at least one scrubber make-up line 210 which may supply a fluid used in the scrubbing process.

The at least one downstream heat exchanger 220 may be located downstream of the at least one scrubber 170 and may cool the at least one exhaust stream 165 down to a reasonable temperature such that the performance of the gas turbine 100 may not be impacted due to a hot inlet air 130 temperature. For example, but not limiting of, the at least one downstream heat exchanger 220 may reduce the temperature of the at least one exhaust stream 165 to a range of about 35 degrees (roughly above a freezing temperature) Fahrenheit to about 100 degrees Fahrenheit.

The at least one downstream heat exchanger 220 may receive and then later discharge a downstream cooling fluid 222,224; which may be of a type that allows for the amount of heat transfer required to lower the temperature of the at least one exhaust stream 165, as discussed.

The at least one downstream heat exchanger 220 may also include at least one condensable line 178, which may remove the portions of at least one exhaust stream 165 that may condense during the heat exchanging process.

The at least one de-mister 230 may be located downstream of the at least one downstream heat exchanger 220 in this second embodiment of the present invention. The at least one de-mister 230 may remove droplets of water from the at least one exhaust stream 165 that may have carried from the scrubbing and the heat exchanging processes.

As discussed, an embodiment of the present invention may include the at least one mixing station 240, which may be located downstream of the at least one downstream heat exchanger 220. The at least one mixing station 240, may be considered a device which mixes the inlet air 125 and the at least one exhaust stream 165, and forms an inlet fluid 250 that enters the compressor 240.

The at least one mixing station 240 may utilize, for example, but not limiting of, baffles, flow turners, or the like, to mix the inlet air 125 with the at least one exhaust stream 165.

As illustrated in FIG. 1, an embodiment of the present invention may not require the at least one mixing station 240. Here, for example, but not limiting of, the inlet air 125 and the at least one exhaust stream 165, may mix within an area adjacent the compressor 110, such as, but not limiting of, an inlet duct, in the plenum, near the inlet filter house, or the like.

In use, the exhaust gas recirculation system 150 of the second embodiment of the present invention functions while the gas turbine 100 is in operation. The EGR flow modulation device 155 may be positioned to allow for the desired flowrate of the at least one exhaust stream 165, as previously described. The at least one exhaust stream 165 may then flow downstream through the at least one scrubber 170, as described above. In the at least one scrubber 170, the temperature of the at least one exhaust stream 165 may be lower to below the saturation temperature. The use of the scrubber cooling fluid 172,174, and the drop in temperature of the at least one exhaust stream 165, may cause a portion of the stream 165 to flow through the scrubber recirculation line 180. A portion of the fluid used within the scrubber 170 may be replaced with fresh fluid via the scrubber make-up line 210.

Next, the at least one exhaust stream 165 may flow downstream of the at least one scrubber 170 to the at least one downstream heat exchanger 220, where a portion of condensable vapors of the at least one exhaust stream 165 may be removed via the condensable line 178. Next, the at least one exhaust stream 165 may flow through the at least one de-mister 230, and then into the at least one mixing station 240, all of which are described above. Downstream of the at least one mixing station 240, the inlet fluid 250 may flow into the compressor 110. This second embodiment of the present invention allows for an alternate configuration of the at least one de-mister 230 and the at least one mixing station 240. For example, but not limiting of, the exhaust gas recirculation system 150 may be configured such that the at least one mixing station 240 is located immediately downstream of the at least one downstream heat exchanger 220; and therefore the at least one de-mister 230 is located downstream of the at least one mixing station 240.

Figure 3:
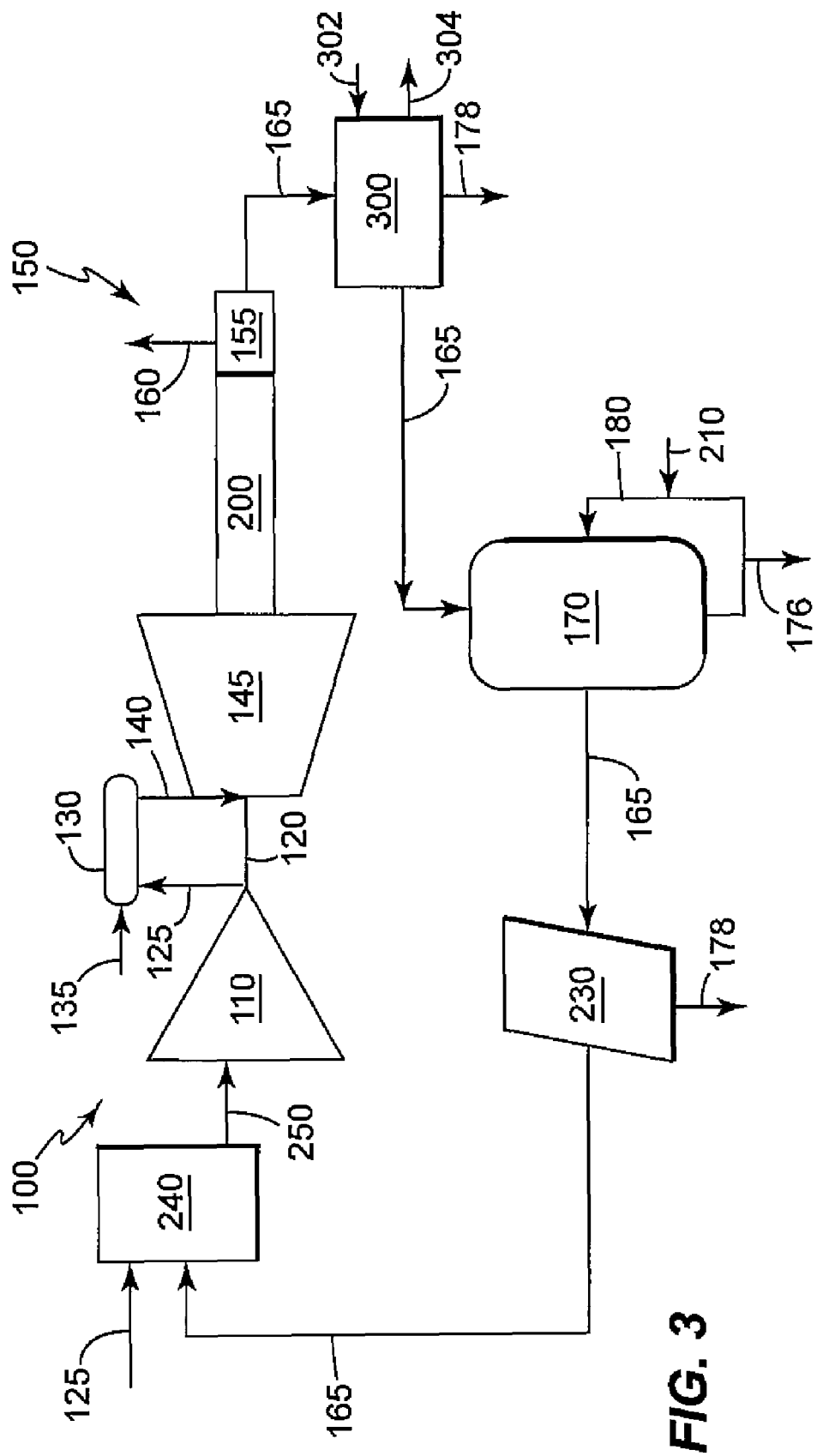
FIG. 3 is a schematic illustrating an example of a system for recirculating the exhaust of a turbomachine in accordance with a third embodiment of the present invention.

FIG. 3 is a schematic illustrating an example of a system for recirculating the exhaust of a turbomachine in accordance with a third embodiment of the present invention. The key difference between this third embodiment and the second embodiment of the present invention is where the at least one heat exchanger is located within the exhaust gas recirculation system 150. As previously discussed, the second embodiment of the present invention may include at least one downstream heat exchanger 220 located downstream of the at least one scrubber 170. However, the third embodiment of the present invention, discussed below, may include at least one upstream heat exchanger 300 located upstream of the at least one scrubber 170. In this third embodiment of the present invention, the exhaust gas recirculation system 150 may include: at least one scrubber 170, at least one upstream heat exchanger 300; at least one de-mister 230; and at least one mixing station 240.

The at least one upstream heat exchanger 300 may be located upstream of the at least one scrubber 170, and may receive the at least one exhaust stream 165 exiting the EGR flow modulation device 155. The at least one upstream heat exchanger 300 may cool the at least one exhaust stream 165 to a range of about 60 degrees Fahrenheit to about 100 degrees Fahrenheit.

The at least one upstream heat exchanger 300 may receive and then later discharge a upstream cooling fluid 302,304; which may be of a type that allows for the amount of heat transfer required to lower the temperature of the at least one exhaust stream 165, as discussed.

The at least one upstream heat exchanger 300 may also include at least one condensable line 178, which may remove portions of the at least one exhaust stream 165 that may condense during the heat exchanging process.

In use, the exhaust gas recirculation system 150 of the third embodiment of the present invention functions while the gas turbine 100 is in operation. The EGR flow modulation device 155 may be positioned to allow for the desired flowrate of the at least one exhaust stream 165, as previously described. The at least one exhaust stream 165 may then flow downstream through the at least one upstream heat exchanger 300, where a potion of condensable vapors of the at least one exhaust stream 165 may be removed via the condensable line 178.

Next, the at least one exhaust stream 165 may flow downstream through the at least one scrubber 170, as described above. Next, the at least one exhaust stream 165 may flow downstream of the at least one scrubber 170 to the at least one de-mister 230, and then into the at least one mixing station 240, all of which are described above. Downstream of the at least one mixing station 240, the inlet fluid 250 may flow into the compressor 110. The third embodiment of the present invention allows for an alternate configuration of at least one de-mister 230 and the at least one mixing station 240. For example, but not limiting of, the exhaust gas recirculation system 150 may be configured such that the at least one mixing station 240 is located immediately downstream of the at least one scrubber 170; and therefore the at least one de-mister 230 is located downstream of the at least one mixing station 240.

Figure 4:
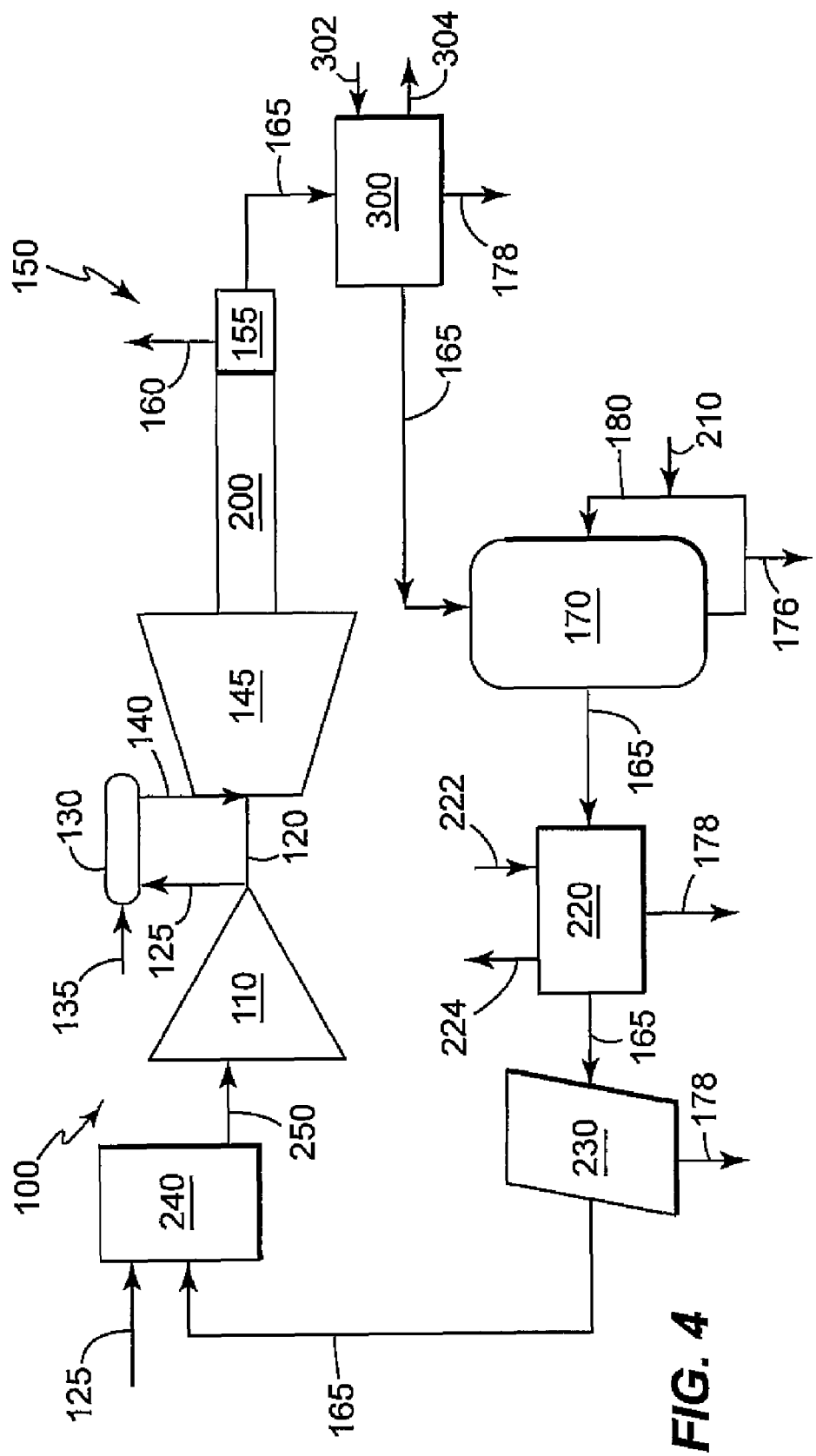
FIG. 4 is a schematic illustrating an example of a system for recirculating the exhaust of a turbomachine in accordance with a fourth embodiment of the present invention.

FIG. 4 is a schematic illustrating an example of a system for recirculating the exhaust of a turbomachine in accordance with a fourth embodiment of the present invention. The configuration of this fourth embodiment of the present invention may allow the heat removal in the at least one exhaust stream 165 to be accomplished be multiple heat exchangers located up and down stream of the at least one scrubber 170. This configuration may allow for relatively smaller heat exchangers than those of the previously described embodiments.

The key difference between this fourth embodiment and the second and third embodiments of the present invention is the inclusion of both the at least one downstream heat exchanger 220 and at least one upstream heat exchanger 300 within the exhaust gas recirculation system 150. In this fourth embodiment of the present invention, the exhaust gas recirculation system 150 may include: at least one scrubber 170, at least one upstream heat exchanger 300; at least one downstream heat exchanger 220; at least one de-mister 230; and at least one mixing station 240.

The fourth embodiment of the present invention may integrate the operation of the at least one upstream heat exchanger 300, at least one downstream heat exchanger 220, and at least one scrubber 170; to remove heat from, and thus lower the temperature of, the at least one exhaust stream 165 in stages, as described next.

In use, the exhaust gas recirculation system 150 of the fourth embodiment of the present invention functions while the gas turbine 100 is in operation. The EGR flow modulation device 155 may be positioned to allow for the desired flowrate of the at least one exhaust stream 165, as previously described. The at least one exhaust stream 165 may then flow downstream through the at least one upstream heat exchanger 300, which may lower the temperature of the at least one exhaust stream 165 to a range of about 120 degrees Fahrenheit to about 150 degrees Fahrenheit. Next, the at least one exhaust stream 165 may then flow downstream to the at least one scrubber 170, as described above. Next, the at least one exhaust stream 165 may flow downstream of the at least one scrubber 170 through the at least one downstream heat exchanger 220, which may lower the temperature of the at least one exhaust stream 165 to a range of about 60 degrees Fahrenheit to about 100 degrees Fahrenheit. Next, the at least one exhaust stream 165 may flow through the at least one de-mister 230, and then into the at least one mixing station 240, all of which are described above. Downstream of the at least one mixing station 240, the inlet fluid 250 may flow into the compressor 110. The fourth embodiment of the present invention allows for an alternate configuration of at least one de-mister 230 and the at least one mixing station 240, as described above.

The fourth embodiment of the present invention may also allow for an alternate staging of the heat removal from the at least one exhaust stream 165. For example, but not limiting of, the at least one upstream heat exchanger 300 may lower the temperature of the at least one exhaust stream 165 to a range of about 150 degrees Fahrenheit to about 350 degrees Fahrenheit; next the at least one scrubber 170 may lower the temperature to about 120 degrees Fahrenheit to about 150 degrees Fahrenheit; and then the at least one downstream heat exchanger 220 may lower the temperature to about 60 degrees Fahrenheit to about 100 degrees Fahrenheit.

Figure 5:
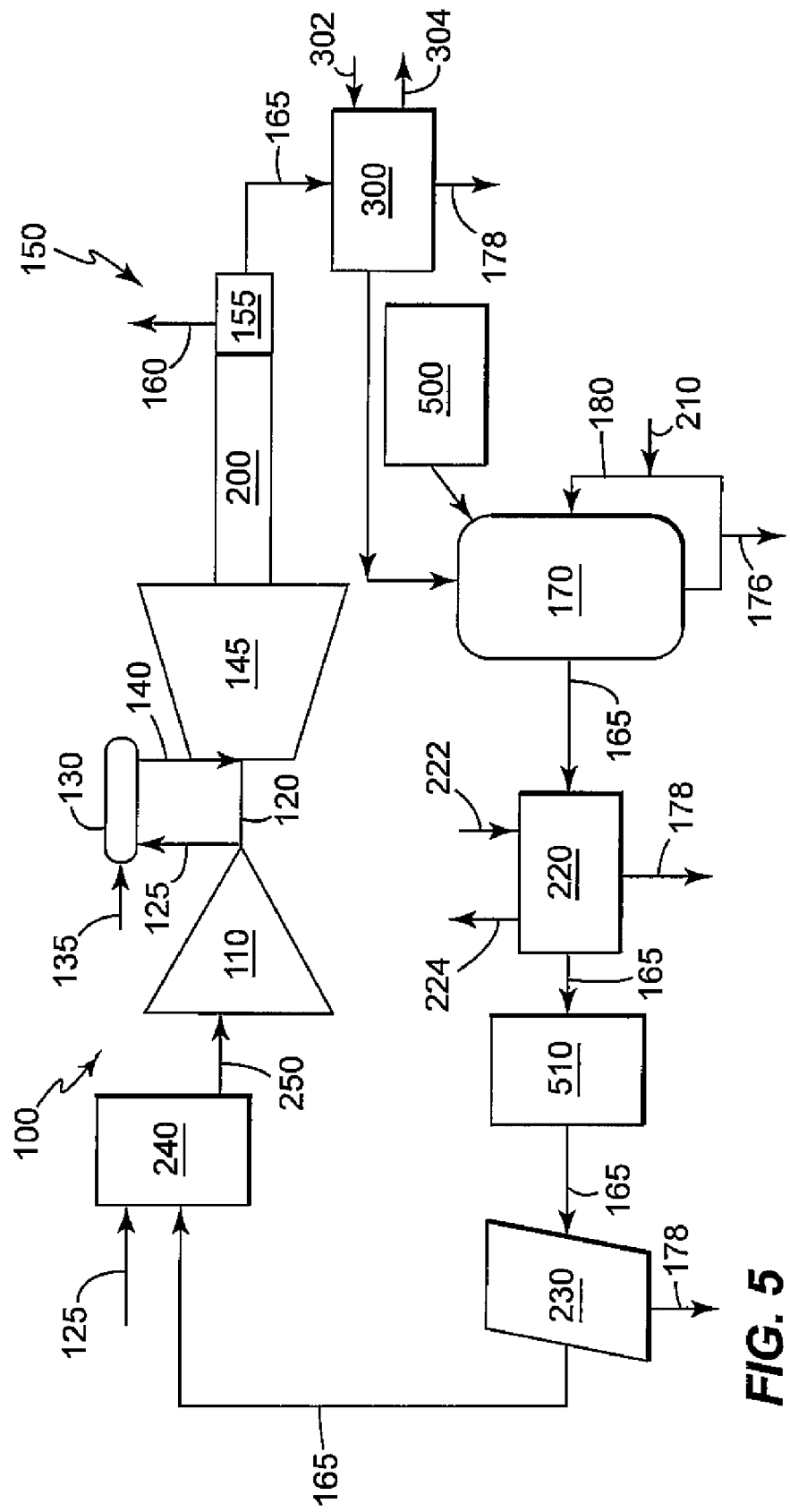
FIG. 5 is a schematic illustrating an example of a system for recirculating the exhaust of a turbomachine in accordance with a fifth embodiment of the present invention.

FIG. 5 is a schematic illustrating an example of a system for recirculating the exhaust of a turbomachine in accordance with a fifth embodiment of the present invention. The key difference between this fifth embodiment and the fourth embodiment of the present invention is the inclusion of at least one injector 500 and at least one wet electrostatic precipitator 510. As discussed, the at least one scrubber 170 may use a fluid in scrubbing process to remove a portion of the constituents within at least one exhaust stream 165. Due to the make-up of the constituents a reagent may be required to assist in the removal of the constituents. The reagent may perform an absorption process to remove the constituents. The reagent may include for example, but not limiting of, an ammonia, a limestone based liquid reagent, water, or the like, and combinations thereof. The at least one injector 500 may inject the reagent into the at least one scrubber 170 of the exhaust gas recirculation system 150.

The absorption process used by the reagent may create a particulate matter that should be removed from the at least one scrubber 170. The at least one wet electrostatic precipitator 510 may remove the particulate matter. Generally the wet electrostatic precipitator 510 may induce an electrostatic charge and utilize a fluid to perform a scrubbing like action, in removing particulate matter from the at least one scrubber 170.

The at least one injector 500 and at least one wet electrostatic precipitator 510 may be added to any of the previous embodiments. As discussed below, the at least one injector 500 and at least one wet electrostatic precipitator 510 may be utilized when the condensing and scrubbing processes previously described do not reduce the constituents within the at least one exhaust stream 165 to the second level.

In the fifth embodiment of the present invention, as illustrated in FIG. 5, the exhaust gas recirculation system 150 may include: at least one scrubber 170; at least one injector 500; at least one upstream heat exchanger 300; at least one downstream heat exchanger 220; at least one wet electrostatic precipitator 510; at least one de-mister 230; and at least one mixing station 240.

In use, the exhaust gas recirculation system 150 of the fifth embodiment of the present invention, as illustrated in FIG. 5, functions while the gas turbine 100 is in operation. The EGR flow modulation device 155 may be positioned to allow for the desired flowrate of the at least one exhaust stream 165, as previously described. The at least one exhaust stream 165 may flow downstream through at least one upstream heat exchanger 300, which may lower the temperature of the at least one exhaust stream 165 to a range of about 120 degrees Fahrenheit to about 150 degrees Fahrenheit. Next, the at least one exhaust stream 165 may then flow downstream to the at least one scrubber 170, to the at least one injector 500 may inject at least one reagent, as described. Next, the at least one exhaust stream 165 may flow downstream of the at least one scrubber 170 through the at least one downstream heat exchanger 220, which may lower the temperature of the at least one exhaust stream 165 to a range of about 60 degrees Fahrenheit to about 100 degrees Fahrenheit.

Next, the at least one exhaust stream 165 may flow through the at least one wet electrostatic precipitator 510, then the at least one de-mister 230, and then into the at least one mixing station 240, all of which are described above. Downstream of the at least one mixing station 240, the inlet fluid 250 may flow into the compressor 110.

The fifth embodiment of the present invention allows for an alternate configuration of at least one de-mister 230 and the at least one mixing station 240, as described above. The fifth embodiment of the present invention may also allow for an alternate staging of the heat removal from the at least one exhaust stream 165, as described.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system of reducing the constituents within an exhaust stream generated by a turbomachine, the system comprising:
    a total exhaust stream operatively generated by the turbomachine having an inlet, a compressor, an external combustion system, an exhaust section, and a turbine section,
        wherein the exhaust stream is a portion of the total exhaust stream exiting the turbomachine;
    an exhaust gas recirculation (EGR) system integrated with the turbomachine and containing a scrubber that:
        receives the exhaust stream containing constituents at a first level at a first temperature from the turbomachine exhaust section;
        reduces the exhaust stream temperature to below the saturation temperature of the exhaust stream;
        reduces the constituents to a second level; sequesters and removes concentrated CO2 from the exhaust stream; outputs the exhaust stream at a second temperature; and
        re-circulates the exhaust stream exiting the scrubber to the inlet of the turbomachine;
    a heat exchanger upstream of the EGR system, the heat exchanger receiving the exhaust stream, reducing the temperature of the exhaust stream, and directing the exhaust stream to flow to an inlet portion of the scrubber;
    a demister located downstream of the heat exchanger that removes water from the exhaust stream; and
    a mixing station located upstream of the turbomachine inlet that mixes the exhaust stream with inlet air entering the turbomachine inlet.

2. The system of claim 1, wherein the temperature of the exhaust stream exiting the heat exchanger ranges from about 120 degrees Fahrenheit to about 150 degrees Fahrenheit, and wherein an upstream cooling fluid flows through the heat exchanger and substantially determines the temperature of the exhaust stream exiting the heat exchanger.

3. The system of claim 1, wherein the temperature of the exhaust stream exiting the heat exchanger ranges from about 150 degrees Fahrenheit to about 1000 degrees Fahrenheit, wherein the temperature of the exhaust stream exiting the scrubber ranges from about 120 degrees Fahrenheit to about 150 degrees Fahrenheit, wherein an upstream cooling fluid flows through the heat exchanger and substantially determines the temperature of the exhaust stream exiting the heat exchanger, and wherein a scrubber cooling fluid substantially determines the temperature of the exhaust stream exiting the scrubber.

4. The system of claim 3, further comprising an injector for injecting a reagent into the scrubber for absorbing a portion of the constituents in the exhaust stream.

5. The system of claim 1, further comprising a heat recovery steam generator (HRSG) installed downstream of the exhaust section and upstream of the scrubber, wherein the exhaust stream flows from the exhaust section of the gas turbine to an inlet portion of the HRSG and then flows from an outlet portion of the HRSG to an inlet portion of the scrubber.

6. The system of claim 1, wherein the constituents of the exhaust stream comprise water, acids, aldehydes, hydrocarbons, or combinations thereof.

7. The system of claim 1, wherein the exhaust stream exiting the exhaust section comprises a flowrate of about 10,000 pounds per hour to about 50,000,000 pounds per hour and a temperature of about 100 degrees Fahrenheit to about 1500 degrees Fahrenheit, wherein the turbomachine controls cooperation of the combustion system and turbine section, which then collectively determine magnitudes of the flowrate and the temperature.

8. The system of claim 1, further comprising an EGR flow modulation device for diverting the exhaust stream from the total exhaust stream exiting the turbomachine.

9. The system of claim 1, wherein the turbomachine comprises a combustion gas turbine.

10. The system of claim 9, wherein the combustion gas turbine comprises a heavy duty gas turbine or an aero-derivative gas turbine.

11. A system of reducing the constituents within an exhaust stream generated by a gas turbine, the system comprising:
    a total exhaust stream operatively generated by the gas turbine having an inlet, a compressor, an external combustion system, an exhaust section, and a turbine section;
    an exhaust gas recirculation (EGR) flow modulation device for diverting the exhaust stream from the total exhaust exiting the gas turbine;
    an (EGR) system integrated with the gas turbine and containing a scrubber that:
        receives the exhaust stream containing constituents at a first level at a first temperature from the gas turbine exhaust section;
        lowers the temperature of the exhaust stream to below the saturation temperature of the exhaust stream;
        reduces the constituents to a second level; sequesters and removes concentrated CO2 from the exhaust stream; outputs the exhaust stream at a second temperature; and
        re-circulates the exhaust stream exiting the scrubber to the inlet of the gas turbine;
    a heat exchanger upstream of the EGR system, the heat exchanger receiving the exhaust stream, reducing the temperature of the exhaust stream, and directing the exhaust stream to flow to an inlet portion of the scrubber;
    a demister located downstream of the heat exchanger that removes water from the exhaust stream; and
    a mixing station located upstream of the gas turbine inlet that mixes the exhaust stream with inlet air entering the gas turbine inlet.

12. The system of claim 11, wherein the temperature of the exhaust stream exiting the heat exchanger ranges from about 120 degrees Fahrenheit to about 150 degrees Fahrenheit, and wherein an upstream cooling fluid flows through the heat exchanger and substantially determines the temperature of the exhaust stream exiting the heat exchanger.

13. The system of claim 11, wherein the temperature of the exhaust stream exiting the heat exchanger ranges from about 150 degrees Fahrenheit to about 1000 degrees Fahrenheit, wherein the temperature of the exhaust stream exiting the scrubber ranges from about 120 degrees Fahrenheit to about 150 degrees Fahrenheit, wherein an upstream cooling fluid flows through the heat exchanger and substantially determines the temperature of the exhaust stream exiting the heat exchanger, and wherein a scrubber cooling fluid substantially determines the temperature of the exhaust stream exiting the scrubber.

14. The system of claim 13, further comprising an injector for injecting a reagent into the scrubber for absorbing a portion of the constituents in the exhaust stream.

15. The system of claim 11, further comprising a heat recovery steam generator (HRSG) installed downstream of the exhaust section and upstream of the scrubber, wherein the exhaust stream flows from the exhaust section of the gas turbine to an inlet portion of the HRSG and then flows from an outlet portion of the HRSG to an inlet portion of the scrubber.

16. The system of claim 11, wherein the constituents of the exhaust stream comprise water, acids, aldehydes, hydrocarbons, or combinations thereof.

17. The system of claim 11, wherein the exhaust stream exiting the exhaust section comprises a flowrate of about 10,000 pounds per hour to about 50,000,000 pounds per hour and a temperature of about 100 degrees Fahrenheit to about 1500 degrees Fahrenheit, and wherein the gas turbine controls cooperation of the combustion system and turbine section, which then collectively determine magnitudes of the flowrate and the temperature.

* * * * *